United States Patent
Yamazaki

(10) Patent No.: US 7,120,365 B2
(45) Date of Patent: Oct. 10, 2006

(54) DIAGNOSTIC DEVICE, DIAGNOSTIC SYSTEM, DIAGNOSTIC METHOD, PROGRAM AND STORAGE MEDIUM

(75) Inventor: Naoki Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/275,231

(22) Filed: Dec. 20, 2005

(65) Prior Publication Data

US 2006/0098992 A1    May 11, 2006

Related U.S. Application Data

(62) Division of application No. 10/254,742, filed on Sep. 25, 2002, now Pat. No. 7,058,317.

(30) Foreign Application Priority Data

Sep. 28, 2001    (JP)    ............................. 2001-299532

(51) Int. Cl.
    *G03G 15/00*    (2006.01)
(52) U.S. Cl. ............................................. 399/8; 399/9
(58) Field of Classification Search .................... 399/8, 399/9, 75, 23
    See application file for complete search history.

(56) References Cited

U.S. PATENT DOCUMENTS

| | | | |
|---|---|---|---|
| 5,287,194 A | 2/1994 | Lobiondo | ................... 358/296 |
| 5,335,048 A | 8/1994 | Takano et al. | .................. 399/8 |
| 5,550,623 A | 8/1996 | Tomita et al. | |
| 5,708,908 A | 1/1998 | Hirata et al. | ................... 399/8 |
| 5,809,363 A | 9/1998 | Kitamura et al. | ............... 399/8 |
| 6,009,284 A | 12/1999 | Weinberger et al. | ........... 399/8 |
| 6,058,277 A | 5/2000 | Streefkerk et al. | ............ 399/81 |
| 6,078,406 A | 6/2000 | Nickerson | ....................... 399/8 |
| 2002/0004814 A1 | 1/2002 | Tanaka | ....................... 709/201 |

FOREIGN PATENT DOCUMENTS

| | | |
|---|---|---|
| JP | 04184600 A | 7/1992 |
| JP | 9-30057 | 2/1997 |
| JP | 10-11240 A | 1/1998 |
| JP | 11-282643 A | 10/1999 |
| JP | 2002-36633 A | 12/2002 |

*Primary Examiner*—Susan Lee
(74) *Attorney, Agent, or Firm*—Fitzpatrick, Cella, Harper & Scinto

(57) ABSTRACT

A diagnostic system that effectively presents optimum products to the users by effectively using information about the use history of an image forming apparatus used by the users and other information specific to the image forming apparatus that may be stored in advance. The diagnostic system includes a management device that receives and manages management information including at least information of print volume of an image forming apparatus for a predetermined period, a determination device that determines an optimum image forming apparatus based on the information of print volume in the predetermined period managed by the management device, and a notification device that notifies information indicative of the optimum image forming apparatus determined by the determination device to an information processing apparatus that is capable of communication via a communication line.

6 Claims, 13 Drawing Sheets

Fig. 6

| User ID | ABCD |
|---|---|
| Log Recording Started Date | 2001/7/12 |
| Log Recording End Date | 2001/11/12 |
| Print Volume | 1100 |
| A4 | 800 |
| A3 | 50 |
| B5 | 150 |
| B4 | 100 |
| Configuration Information | |
| Two-face Unit | No |
| Staple Unit | No |
| Paper Feed Cassette | 250 |
| Option | Yes / 500 |
| A4 | Yes |
| A3 | No |
| B5 | No |
| B4 | No |
| Printer Model | AAA |
| Lot No. | XXX |
| Manufactured Date | YYY |
| Electronic Mail Address | vvvv |

Fig. 8

- Optional Paper Feed/Delivery Apparatus for Printer A
  [250 sheets feeder, 250 sheets delivery stacker]
- Optional Paper Feed/Delivery Apparatus for Printer B
  [500 sheets feeder, 500 sheets delivery stacker]
- Optional Paper Feed/Delivery Apparatus for Printer C
  [500 sheets feeder, 500 sheets feeder x 2 stages, 1500 sheets feeder, 1500 sheets feeder x 2 stages, 500 sheets delivery stacker, 500 sheets delivery stacker x 2 stages, 5-bin Mail Box]
- Optional Paper Feed/Delivery Apparatus for Printer D
  [1000 sheets feeder, 1000 sheets feeder x 2 stages, 2000 sheets feeder, 1000 sheets delivery stacker, 1000 sheets delivery stacker x 2 stages, 10-bin Mail Box]

DIAGNOSTIC DEVICE, DIAGNOSTIC SYSTEM, DIAGNOSTIC METHOD, PROGRAM AND STORAGE MEDIUM

RELATED CASE

This application is a divisional of application Ser. No. 10/254,742, filed Sep. 25, 2002 now U.S. Pat. No. 7,058,317, the entire disclosure of which is incorporated herein by reference.

BACKGROUND OF THE INVENTION

1. Field of the Invention

The present invention relates to a diagnostic device, a diagnostic system, a diagnostic method, a program and a medium that, depending on the usage history of an image forming apparatus that a user uses, can diagnose the optimum image forming apparatus and/or optional devices and provide the diagnostic results to the user.

2. Description of Related Art

There are systems that can detect the degree of consumption of toner within a toner cartridge used in an image forming apparatus and display on a display section provided on the main body of the image forming apparatus an instruction to replace the toner cartridge when the amount of the toner left falls below a predetermined value.

There are also systems proposed in which a signal instructing a purchase order for a new toner cartridge is send via telephone lines when the toner runs low, thereby requesting a purchase to an information processing apparatus installed at the dealer.

Furthermore, there are systems proposed in which a device such as a counter is installed on a toner cartridge or the main body of the image forming apparatus, and for example, the number of pages printed is counted by the counter, and a determination is made when the count value reaches a certain value that the toner cartridge or the image forming apparatus has reached the end of its life, and a warning is provided.

However, there has not been any systems among prior art that makes an effective use of operational history information, such as cumulative print volume of image forming apparatuses, in spite of the fact that there have been prior art that, for example, automatically place an order for a new toner when the toner runs low, or that notify the user of the image forming apparatus' or any part of the image forming apparatus' reaching the end of its life.

In the meantime, when the printer main body itself reaches the end of its life or becomes obsolete and the user is ready to replace it with a new model, the user must access web sites operated by dealers or send for a catalog from dealers and select by himself or herself the product that appears to be most suitable based on the past usage as he or she compares various product specifications, which is a very time-consuming and onerous process. In addition, this process still entails the possibility that the user would select a product that is not suitable for the user's usage frequency.

Furthermore, even when a serviceperson is called to consult about the purchase of a new image forming apparatus, since the serviceperson in fact is in the habit of suggesting an image forming apparatus that appears to fit the customer's wishes based on the serviceperson's own experience, this process is equally onerous as the process in which the customer researches by himself or herself, and still there is no guarantee that the serviceperson would be able to recommend an appropriate product.

SUMMARY OF THE INVENTION

The present invention relates to a system that effectively presents optimum products to the user by effectively using information about the use history of an image forming apparatus used by the users and other information specific to the image forming apparatus that may be stored in advance.

In accordance with an embodiment of the present invention, a diagnostic apparatus includes: a management device that receives and manages management information including at least information of print volume of an image forming apparatus for a predetermined period; a determination device that determines an optimum image forming apparatus based on the information of print volume in the predetermined period managed by the management device; and a notification device that notifies information for display indicative of the optimum image forming apparatus determined by the determination device to an information processing apparatus that is capable of communication via a communication line.

Preferably, the determination device may determine the optimum image forming apparatus based on a search table that correlates the information of print volume for the predetermined period to predetermined types of image forming apparatuses.

Preferably, the management information may include type information of a type of the image forming apparatus, the determination device may determine an optimum option for the image forming apparatus based on the type information and the information of print volume for the predetermined period, and the notification device may notify the optimum option to the information processing apparatus.

The option described above may be a paper feed option or a paper delivery option.

The determination device may preferably determine the optimum paper feed option such that the number of paper to be fed in a predetermined period is a specified number with respect to the information of print volume for the predetermined period.

The predetermined number may preferably be set according to information indicative of a number that is input in accordance with a direction by the user, and may be notified to the information processing apparatus.

In accordance with a preferred embodiment of the present invention, the diagnostic apparatus may further includes an extraction device that extracts an optimum option from among at least one of a plurality of kinds of options and a plurality of combinations of options, and the notification device may notify the optimum option extracted by the extraction device to the information processing apparatus.

Preferably, the aforementioned information processing apparatus may be the image forming apparatus.

In accordance with another embodiment of the present invention, a diagnostic apparatus comprises: a management device that receives and manages management information including at least information of print volume of an image forming apparatus for a predetermined period; a determination device that determines an optimum paper feed option for the image forming apparatus based on the information of print volume in the predetermined period managed by the management device; and a notification device that notifies information for display indicative of the optimum paper feed option determined by the determination device to the image forming apparatus or a information processing apparatus that is communicatively connected to the diagnostic apparatus.

Preferably, the management information may include identification information that identifies the type of the image forming apparatus, and the determination device may specify a paper feed option according to the identification information.

Furthermore, the determination device may preferably determine the optimum paper feed option such that the number of paper to be fed in a predetermined period is a specified number with respect to the information of print volume for the predetermined period.

In accordance with another embodiment of the present invention, a diagnostic system includes: a notification device that notifies management information including at least information indicative of print volume for a predetermined period of an image forming apparatus to a diagnostic server that is capable of communication via a communication line; a management device that receives and manages the management information including at least the information indicative of print volume of the image forming apparatus for the predetermined period notified by the notification device; a determination device that determines an optimum image forming apparatus based on the information of print volume in the predetermined period managed by the management device; and a device that notifies information for display indicative of the optimum image forming apparatus determined by the determination device to an information processing apparatus that is capable of communication via a communication line.

More over, in accordance with another embodiment of the present invention, a diagnostic system includes: a notification device that notifies management information including at least information indicative of print volume for a predetermined period of an image forming apparatus to a diagnostic server that is capable of communication via a communication line; a determination device that determines an optimum paper feed option for the image forming apparatus based on the information of print volume in the predetermined period notified by the notification device; and a device that notifies information for display indicative of the optimum paper feed option determined by the determination device to the image forming apparatus or an information processing apparatus via a communication line.

Other features and advantages of the invention will be apparent from the following detailed description, taken in conjunction with the accompanying drawings that illustrate, by way of example, various features of embodiments of the invention.

BRIEF DESCRIPTION OF DRAWINGS

FIG. 6 shows a table indicating one example of information sent by the user's equipment or of management information managed by the diagnostic server.

FIG. 8 shows one example of a search table to specify optional products that match image forming apparatuses.

PREFERRED EMBODIMENTS OF THE INVENTION (First Embodiment)

A printer recommending system in accordance with an embodiment of the present invention will be described with reference to the accompanying drawings.

Figure 1:
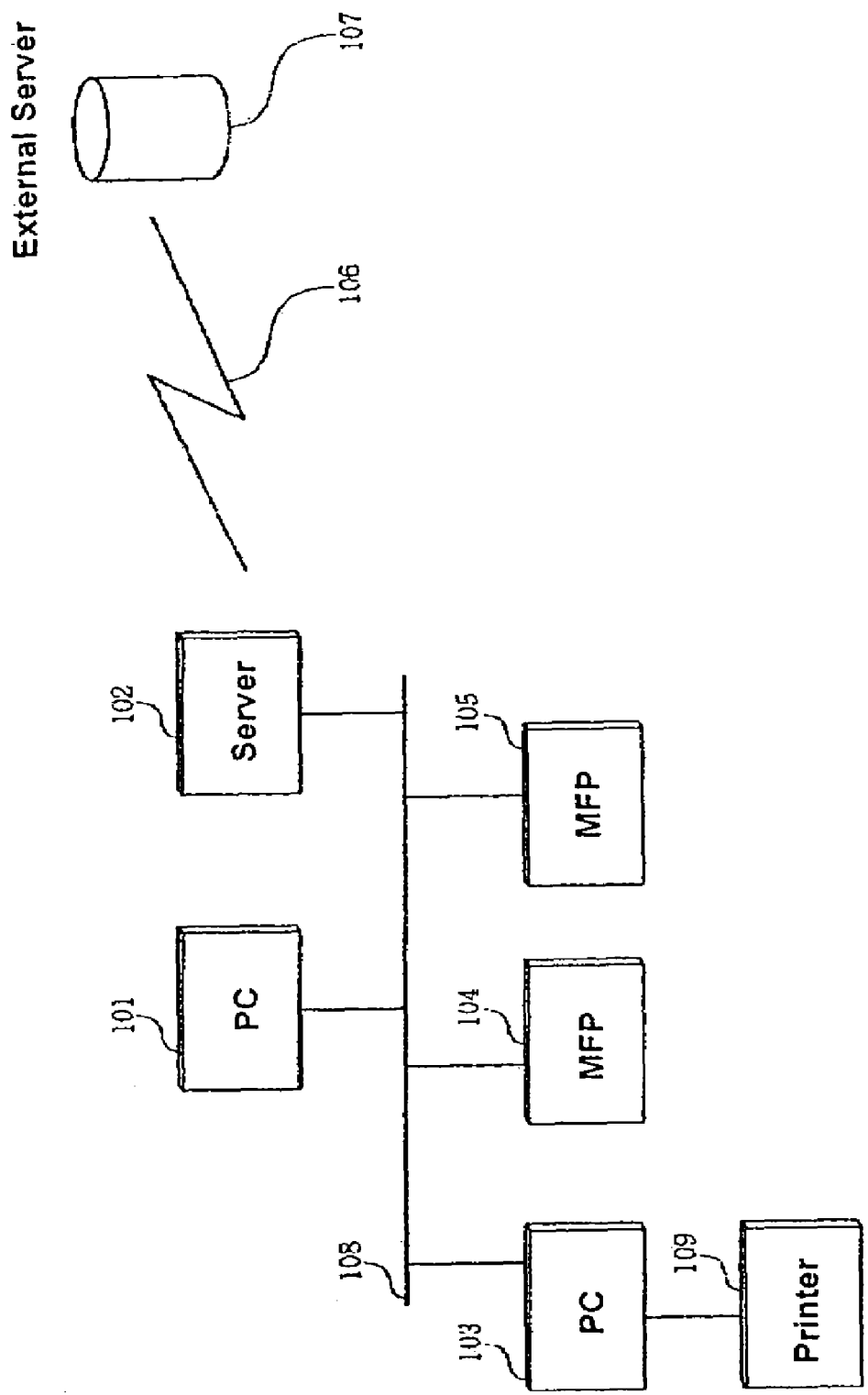
FIG. 1 schematically shows an overall structure of a system in accordance with a first embodiment of the present invention.

FIG. 1 schematically shows an overall structure of a printer recommending system in accordance with a first embodiment of the present invention. Reference numerals 101 and 103 denote personal computers, which are information processing apparatuses that users use. Each of the personal computers may be equipped with a function to send via a communication line 108 print data to MFP printers (multifunctional peripheral printers) 104 and 105, which are image forming apparatuses, and to have the MFP printers 104 and 105 print, as well as a function to have, via the communication line 108, the MFP printers 104 and 105 execute processing based on various application programs. The communication line 108 can be a LAN (local area network), in which data communication is built according to the Ethernet communication method on a coaxial cable.

Reference numeral 102 denotes an information processing apparatus such as a server that communicates data with external servers such as an external server 107 through a communication line 106. The communication line 106 that connects the server 102 with external servers can be a telephone line or an optical fiber communication line. Image forming apparatuses are not limited to laser beam printers, and inkjet printers operating under the inkjet method or thermal printers operating under the thermal transfer method can also be applied to the present invention. Additionally, in a mode in which a telephone line is used as the communication line 106, the external server 107 may be equipped with a modem with modulation and demodulation functions.

Figure 2:
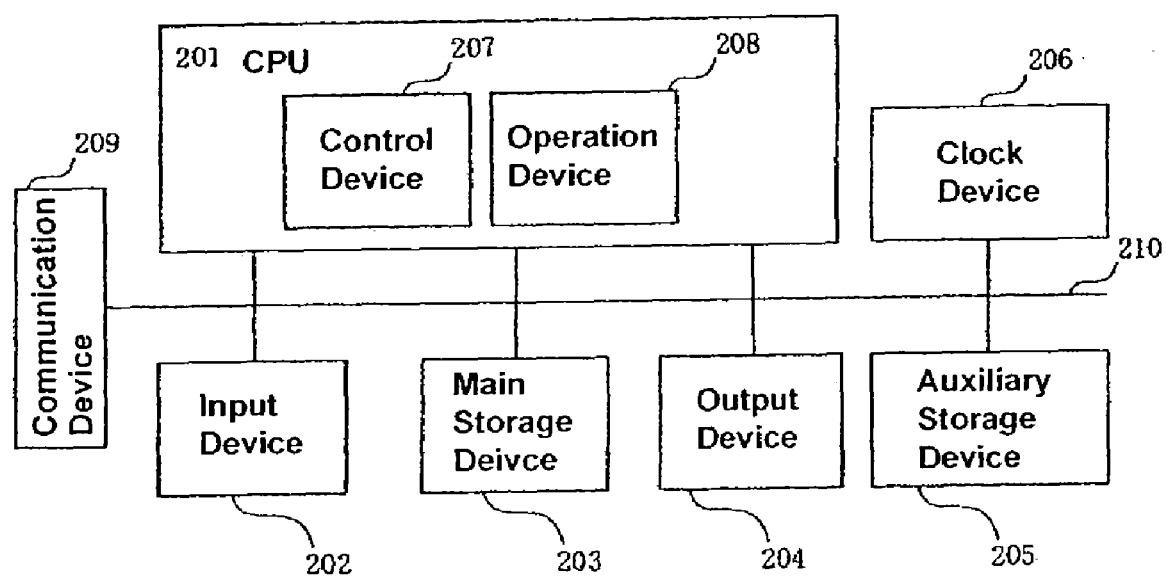
FIG. 2 shows a block diagram of representative functions of an information processing apparatus.

FIG. 2 is a typical block diagram of an information processing apparatus and shows a configuration (functionality) of a personal computer or an information processing apparatus used by the user.

The information processing apparatus comprises a CPU (central processing unit) 201, an input device 202, a primary storage 203, an output device 204, a secondary storage 205, a clock device 206, and a communication device 209.

The CPU 201 is a device also known as a processor, and it comprises a control device 207 that sends commands to various devices within the system and controls their operations, and an operation device 208 that is a central part of the server and that performs operation processing of digital data.

The CPU 201 works with programs stored in the primary storage 203 or the secondary storage 205 and thereby functions as various means that are components of the present invention. Consumable goods according to the present embodiment include, for example, toners for copiers, photoconductor drums, ink for inkjet printers, other consumable parts of the main body, paper and overhead projection sheets, in addition to toner cartridges.

Furthermore, the CPU 201 functions as a store management device that manages storing information in the primary storage 203 and the secondary storage 205, as well as an updating device to update information stored in the storages.

Functions of the various devices described above may be realized by the CPU 201's working with programs that are stored in the primary storage 203 or the output device 204.

The control device 207 reads, in accordance with clock timing generated by the clock device 206, onto the primary storage 203 data that are input from the input device 202 or procedures provided in advance (e.g., programs or software), and commands the operation device 208 to perform operation processing based on the content read. The result of such operation processing is sent to internal equipment, such as the primary storage 203, the output device 204, and the secondary storage 205, and/or external equipment, based on the control by the control device 207.

The input device 202 is a device for inputting various data, and it may be, for example, a keyboard, a mouse, a pointing device, a touch panel, a mouse pad, a CCD camera, a card reader, a paper tape reader, or a magnetic tape device.

The primary storage 203 is a device also known as a memory, and it is a member that represents all of the addressable storage space used to execute commands in a processor or internal storage. The primary storage 203 mainly comprises semiconductor memory elements, and it stores and retains programs and data that were input, as well as reads according to instructions from the control device 207 to a register, for example, data that are stored and retained.

The semiconductor memory elements that comprise the primary storage 203 are RAM (random access memory) and/or ROM (read-only memory).

The output device 204 is a member that outputs the result of operations by the operation device 208, and it can be a CRT, a plasma display panel, a liquid crystal display or other display devices, printing devices such as printers, or speech output devices.

The secondary storage 205 is a member that supplements the storage capacity of the primary storage 203, and it can be a floppy disk, a hard disk, a CD-ROM, a CD-R, a CD-RW, or an MO comprising a magnetic disk, an optical disk, or a semiconductor disk. The secondary storage 205 can also be a database.

The communication device 209 is a device that communicates with external networks, and it sends or receives data to and from, and performs digital-analog conversions as necessary for, the network connected.

Each of the devices described above is connected mutually to each other through an address bus or a data bus.

The number of the primary storage 203 and of the secondary storage 205 is not limited to one each, and there may be any number of the devices. As the number of the primary storage 203 and/or of the secondary storage 205 increases, the fault tolerance of the server increases proportionately.

Figure 3:
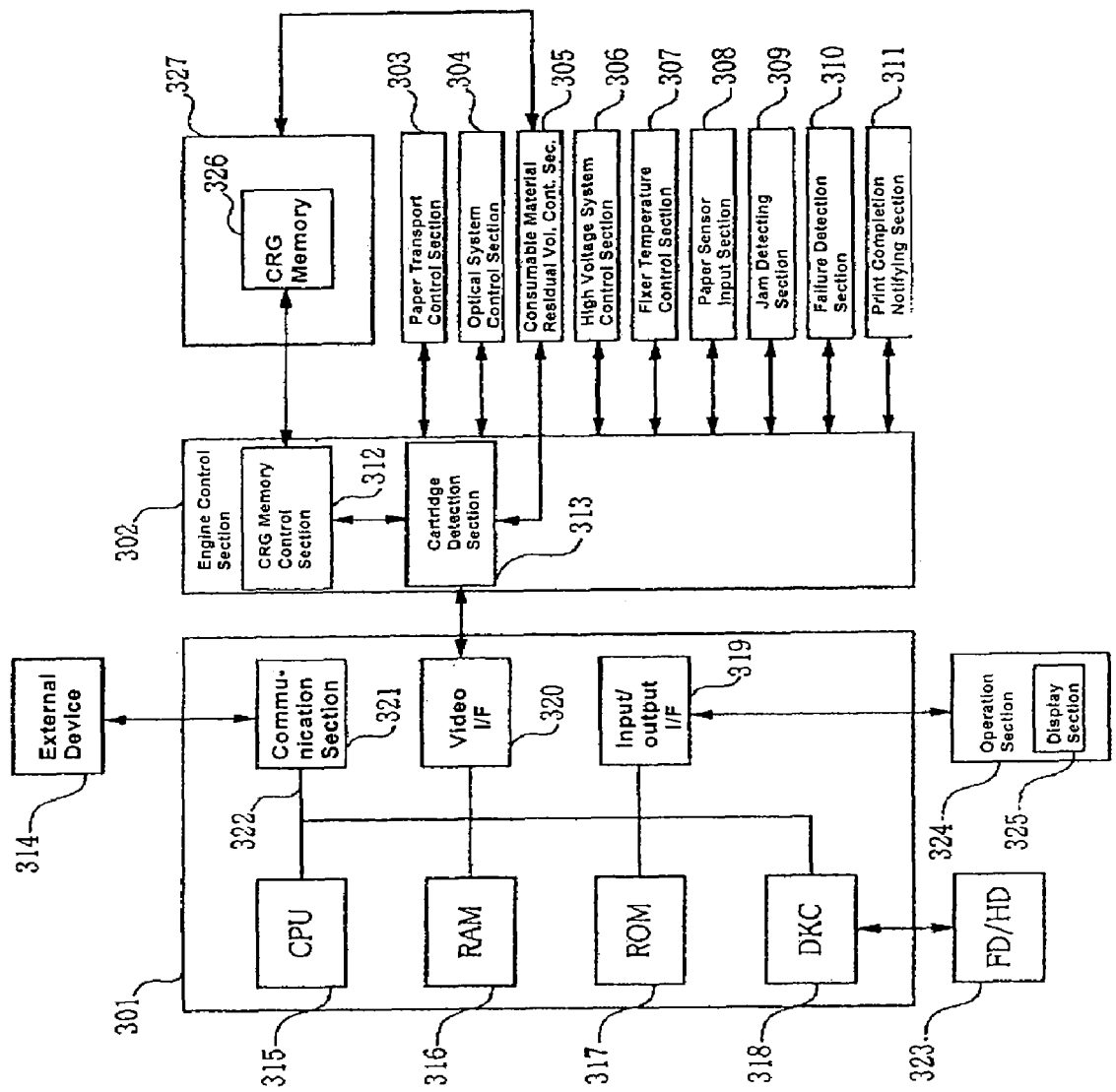
FIG. 3 shows a block diagram of representative functions of an image forming apparatus.

Next, we will use a block diagram in FIG. 3 to describe typical functions of the image forming apparatus according to the present embodiment.

In FIG. 3, reference numeral 301 denotes a printer controller. The printer controller 301 may be equipped with a communication section 321, which sends and receives various data to and from an external device 314 (which is equivalent to the personal computer 101 in FIG. 1), which can be a host computer; and a video interface 320, which receives communication and image data, develops the image data received into information that is printable by a printer, and performs exchange of signals and serial communication with a printer engine control section described later.

A CPU 315 of an image forming apparatus that consolidates, based on a control program stored in a ROM 317 or a storage device such as a hard disk (HD) and/or a floppy disk (FD) 323, the control of access to various devices connected to a system bus 322 and that outputs image signals as output information to a printer engine connected via the video interface 320.

A RAM 316 is a RAM that functions as the primary memory and work area for the CPU 315.

A memory controller (DKC) 318 controls access to the external memory 323, which can be an HD or an FD, that stores a boot program, various applications, font data, user files and editing files. The operation section 324 includes a display panel 325 and a keyboard, and it allows such elements to provide information to an operator or accept input of instructions from the operator via an input/output interface 319.

Reference numeral 302 denotes an engine control section that controls various units of the printer engine through the exchange of signals and serial communication with the printer controller. Reference numeral 303 denotes a paper transport control section that based on instructions from the engine control section 302 transports paper to be printed on from paper feed to delivery after printing. A reference numeral 304 denotes an optical control section that based on instructions from the engine control section 302 drives a scanner motor and executes on/off control of laser. A reference numeral 305 denotes a consumable material (e.g., toner) residual volume control section that detects the residual volume of toner in a cartridge and communicates this information to the engine control section 302. A reference numeral 306 denotes a high voltage control section that based on instructions from the engine control section 302 provides high voltage output required for electronic photographic processes, such as charging developing and transfer. A reference numeral 307 denotes a fixing temperature control section that based on instructions from the engine control section 302 controls the temperature of a fixer and detects abnormalities in the fixer. A reference numeral 308 denotes a paper sensor input section that communicates to the engine control section 302 information from the paper sensor in paper feed section and paper transporting route. A reference numeral 309 denotes a jam detecting section that detects transporting failure while paper is being transported. A reference numeral 310 denotes a failure detection section that detects failures in functioning sections of the printer. A reference numeral 311 denotes a print completion notifying section that detects that the printing was executed normally and notifies of it to the engine control section 302. Based on a print completion notification signal from the print completion notifying section 311 and on the paper size recognized by the printer controller 301 in response to the signal, the image forming apparatus manages the cumulative print volume by paper size as history. Furthermore, by having operational history information of the image forming apparatus stored as history in a nonvolatile memory provided in a cartridge, which is later described as a preferred embodiment, the usage history of the cartridge can be stored accurately as history and there will be no need to provide a nonvolatile memory in the main body of the image forming apparatus to record history.

A reference numeral 327 denotes a consumable material cartridge that is detachably mounted on the printer engine and that contains a consumable material such as toner. A nonvolatile memory 326 that is a cartridge (CRG) memory is installed in the consumable material cartridge 327. The nonvolatile memory 326 can exchange data with the engine control section 302, which allows data to be read from or written onto the nonvolatile memory 326 by the engine control section 302.

The nonvolatile memory (also called a nonvolatile memory device) 326 stores information such as start date for using a developer and residual volume of the developer; it can be any memory as long as it stores and retains signal information in a rewritable manner, and it can be an electric storage means such as RAM or rewritable ROM, or a magnetic storage means such as a magnetic recording medium, magnetic bubble memory or optical magnetic memory. In the present embodiment, NV (nonvolatile) RAM is used, due to its ease of use and cost considerations.

Referring back to FIG. 3, a cartridge (CRG) memory control section 312 is inside the engine control section 302 and has a function to read data from the nonvolatile memory 326 and to rewrite the contents of the nonvolatile memory 326. Reference numeral 313 denotes a cartridge usage detection means that is inside the engine control section 302 and that based on information from the consumable material residual control device 305 discerns the life expectancy of the toner cartridge 327 and communicates this information to the memory control section 312.

In addition, although omitted from drawings, there is a memory lock control section in the CRG memory control section 312 that based on the life expectancy information from the cartridge usage detection means 313 writes the life expectancy data onto the nonvolatile memory 326 within the cartridge and that executes at a predetermined timing a processing on a lock function section of the nonvolatile memory 326 that prohibits rewriting of the data.

Furthermore, the CRG memory control section 312 has a function, in response to a request via the video interface 320 from the printer controller 301 to read the CRG memory 326, to read data (address) designated by the printer controller 301 and to send the data read to the printer controller 301; and a function, in response to a request via the video interface 320 from the printer controller 301 to write onto the CRG memory 326, to write data (address) designated by the printer controller 301 onto the CRG memory 326. Another mode in which the printer controller 301 itself directly reads from and writes onto the CRG memory 326 can also be applied to the present invention.

Figure 4:
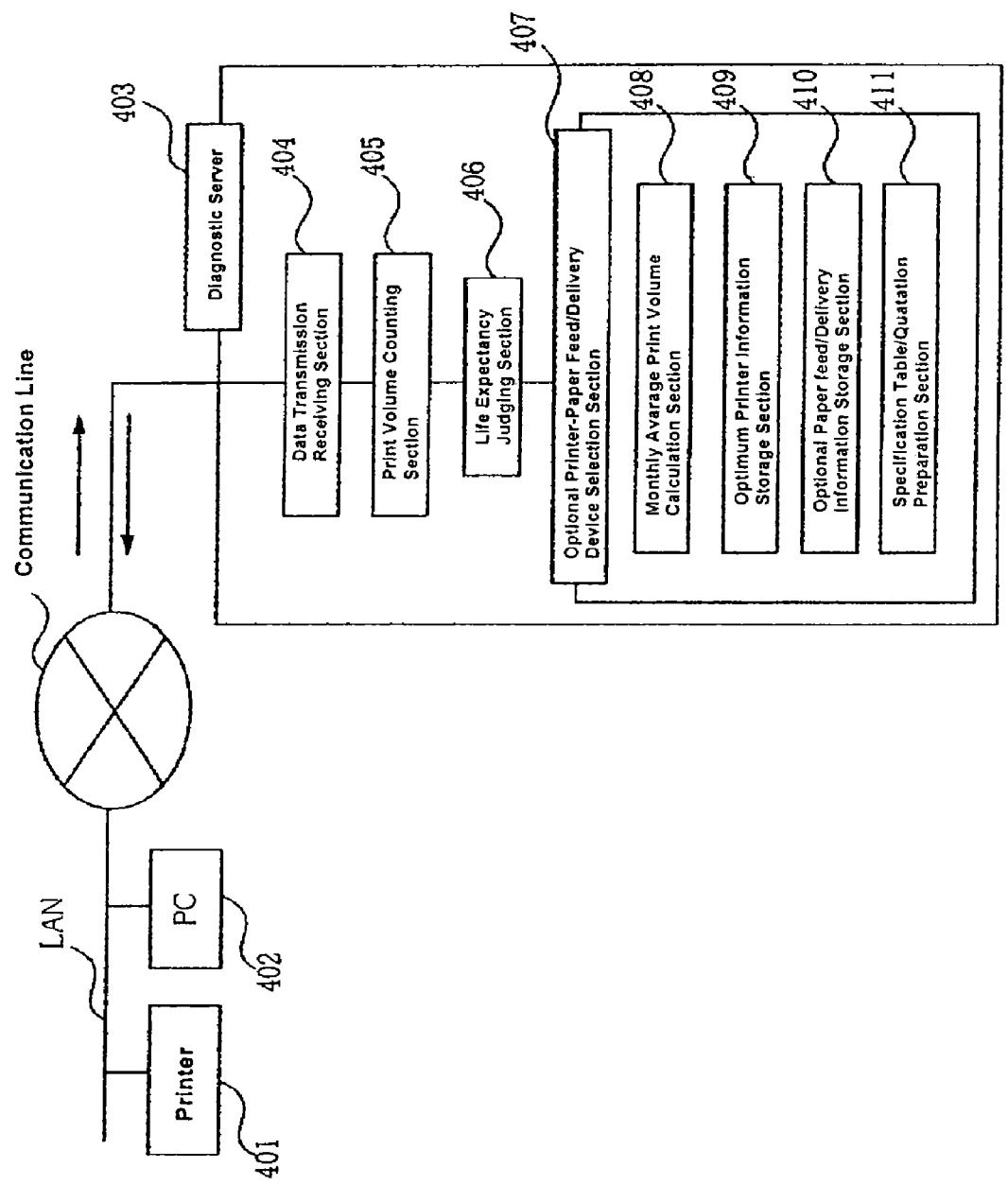
FIG. 4 shows a system module configuration in accordance with the first embodiment.

FIG. 4 indicates modules of various functions of a diagnostic server 403 according to the present embodiment. Functions shown in FIG. 4 may be realized by the various devices shown in FIG. 2 and are based on having the CPU 201 read program codes stored in a nonvolatile memory provided in a diagnostic server and execute processing according to the program codes read.

A data transmission/receiving section 404 has a function to send and receive various data to and from a printer 401, which is an image forming apparatus owned by a user, or an information processing apparatus 402, which is a personal computer, via a communication line. A print volume counting section 405 periodically counts the print volume (e.g., the number of pages printed) by the printer 401 that the user owns. A life expectancy judging section 406 judges whether the printer 401 matches the conditions set in advance. The judging process will be described in detail later in the description of step S503 in FIG. 5.

An optional printer and paper feed/delivery device selection section 407 has an average monthly print volume (PV) calculating section 408, an optimum printer information storage section 409, an optional paper feed/delivery device information storage section 410 and a specification table/quotation preparation section 411. When the result of judgment by the life expectancy judging section 406 matches the conditions set in advance, the optional printer and paper feed/delivery device selection section 407 finds the average monthly print volume (PV) calculated and searches for the optimum printers that match the PV value from the optimum printer information storage section 409. Information managed by the optimum printer information storage section 409 may be the latest information about printers. Naturally, the information managed by the optimum printer information storage section 409 is not limited to the latest information about printers, and also includes information concerning various image forming apparatuses such as facsimile machines, copiers and digital composiers, as well as information concerning any image forming apparatuses that are sold on the market.

When the value found by dividing the value of PV by the paper feed capacity of the printer selected exceeds a predetermined value, optional paper feed/delivery devices that can be mounted on the printer selected (an image forming apparatus) are selected by the optional paper feed/delivery device information storage section 410.

A specification table/quotation for a printer and/or optional paper feed/delivery devices selected in this manner is prepared and notified to the user. This notification can be done by sending data to the user's information processing apparatus 402 or by directly outputting the information to the user's printer 401.

Figure 5:
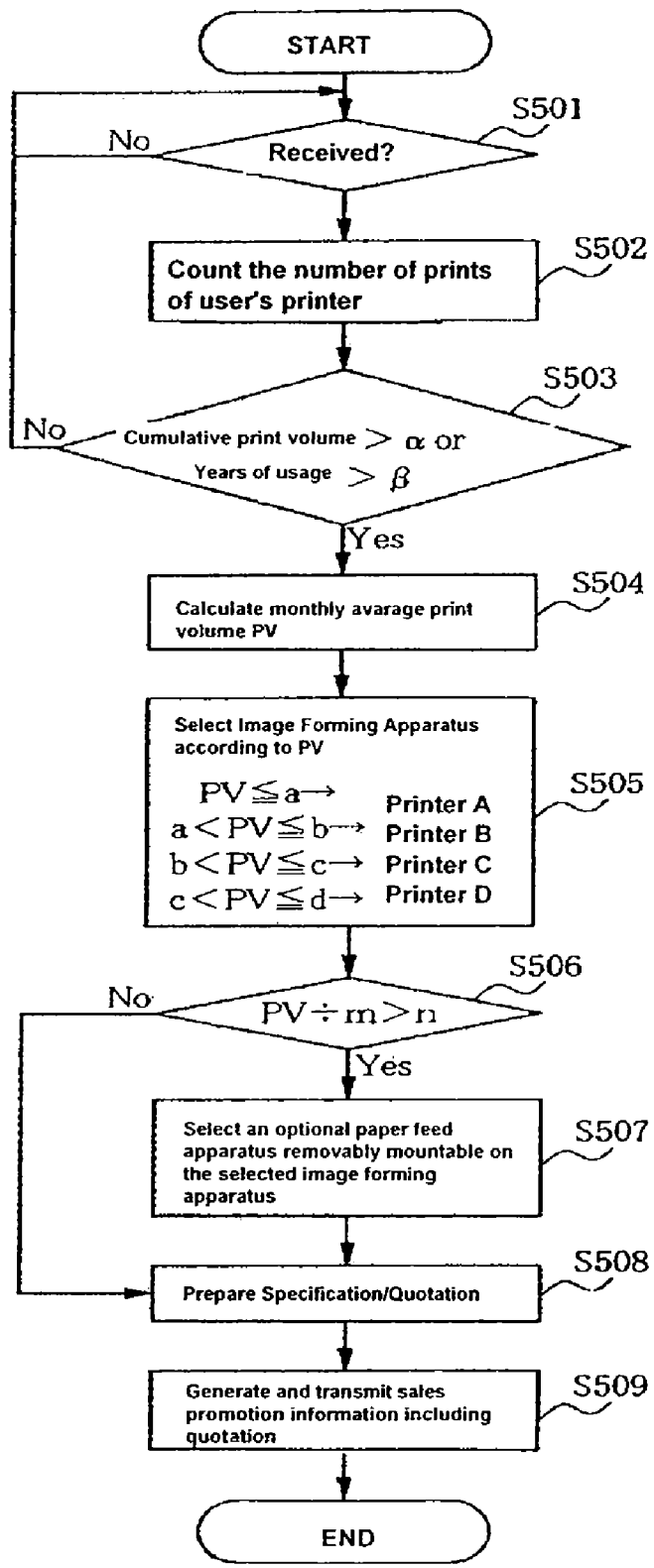
FIG. 5 shows a flowchart indicating one example of diagnostic processing by a diagnostic server in accordance with the first embodiment.

Next, referring to FIG. 5, the processing by the diagnostic server in FIG. 4 is described in greater detail. Processing that takes place in each of the steps in a flowchart in FIG. 5 is realized by having a principal element that performs the processing, whether the image forming apparatus 401 or a CPU provided in the server, read program codes stored in a nonvolatile memory device such as ROM or a hard disk and execute processing according to the program codes read.

First, in step S501, whether history information of the image forming apparatus 401 and management information such as model information of the image forming apparatus 401 have been received by the diagnostic server 403 is determined. The information sent to a diagnostic device is data that is periodically sent by the user via a communication line comprising the Internet. FIG. 6 shows one example of the structure of the data sent.

The information that is sent from the image forming apparatus 401 via the communication line can be in a mode in which the server 403 periodically calls the image forming apparatus 401, or a mode in which the image forming apparatus 401 uses a timer function it has to periodically notify the server 403 as part of a routine.

The data shown in FIG. 6 includes user ID, log recording start date, log recording end date, print volume for each paper size, configuration information of the image forming apparatus, printer model name, lot number, manufactured date, and an electronic mail address that indicates the sender of data.

The user ID is identification information that is issued when the user registers for product recommendation services provided according to the present invention, and can certainly be omitted.

The configuration information includes optional products that can be installed on the image forming apparatus 401. The printer model name refers to the name of the printer. However, if the information provided from the image forming apparatus 401 allows the diagnostic server 403 to identify the printer model, the printer model name can be replaced with predetermined identification data such as model ID number. The lot number is a number assigned to the product during its manufacture in a plant and the product model can be specified by the lot number as well.

The printer model, the lot number, the manufactured date and the electronic mail address can be information included in advance in utility software executed on the image forming apparatus 401 or the personal computer 402, or they can be information set by the user's input.

Information with data structure as shown in FIG. 6 is created based on history information that is recorded on the image forming apparatus 401, and the history information can be created by the image forming apparatus 401 or it can be created based on history information and information concerning printer model sent from the image forming apparatus 401 and received by a personal computer (information processing apparatus) 402 that is connected communicatively with the image forming apparatus 401 via the user's LAN.

In step S502, the information that was received in step S501 is stored in the storage section. The accumulation of data in the storage section is executed in a manner in which at least the date information and history information in FIG. 6 are correlated. In other words, by storing the history information shown in FIG. 6 so that it has a correlation to date information, it becomes possible to manage the history information (e.g., print volume) in a chronological order.

In step S503, a determination is made as to whether the cumulative print volume exceeds a predetermined value ($\alpha$) or whether the number of years the image forming apparatus 401 has been used exceeds a predetermined value ($\beta$), based on information stored in the predetermined storage section in step S501. Specifically, a determination is made as to whether the cumulative print volume exceeds the value $\alpha$ (for example, 450,000 pages), which is the print volume over the lifetime of the image forming apparatus 401 less margin print volume, or whether the number of years used exceeds the value $\beta$ (for example, five years), which is the life expectancy of the image forming apparatus 401 less margin period.

If it is determined that either the cumulative print volume or the number of years used matches the conditions defined in step S503, the processing proceeds to step S504. If it is determined that neither matches the conditions defined in step S503, the processing returns to step S501.

In step S504, the average monthly print volume (PV) is calculated based on the log recording start date, the log recording end date and the print volume that are specified in the history information in FIG. 6.

In step S505, a processing to specify the optimum printer takes place based on the PV calculated in step S504. Specifically, if $PV \leq a$, printer A is selected as the optimum printer; if $a < PV \leq b$, printer B is selected as the optimum printer; if $b < PV \leq c$, printer C is selected as the optimum printer; and if $c < PV \leq d$, printer D is selected as the optimum printer.

Figure 7:
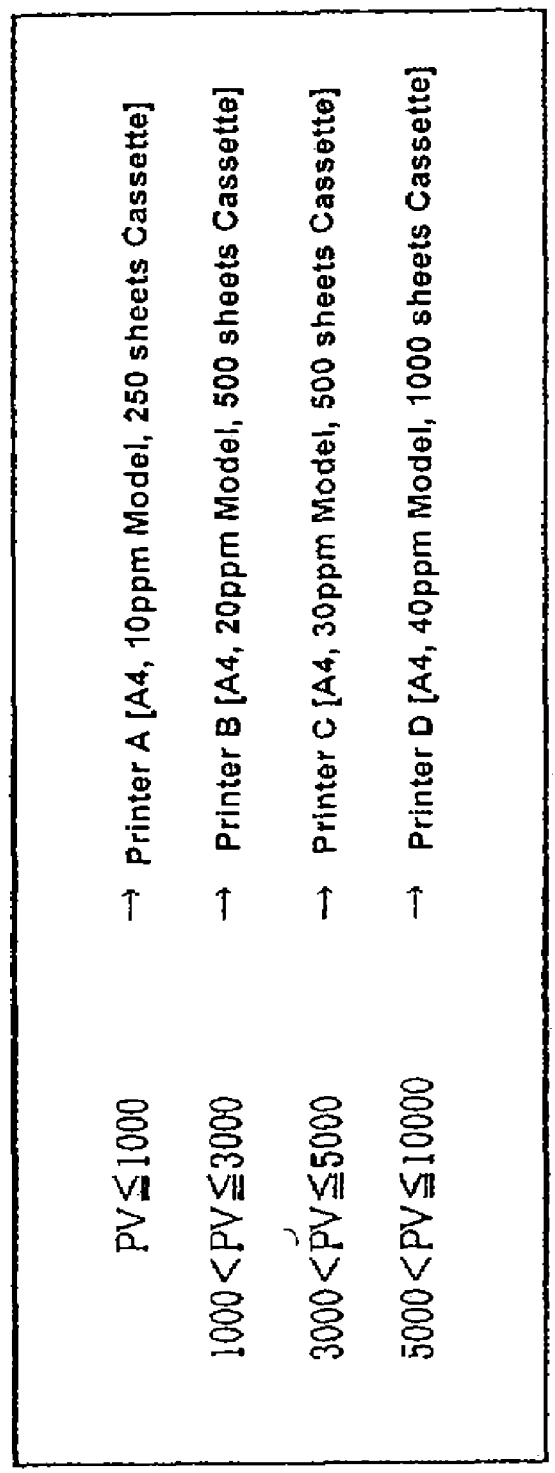
FIG. 7 shows one example of a search table to specify image forming apparatus based on the management information sent from the user.

The optimum printer information storage section 409 stores information concerning optimum printers that match the average monthly print volume PV in the following manner. One example of a diagnostic table stored in the storage section of the diagnostic server 403 is shown in FIG. 7. Image forming apparatuses with various printing speeds and paper capacities are specified to match various print volumes (average monthly print volume) in a predetermined period.

In step S506, a determination is made as to whether the value of the average monthly print volume PV (for example, 3,500 pages) divided by a paper capacity m (for example, 500 pages) of the standard cassette of the printer selected exceeds a predetermined value n (for example, 4); if it is determined that the division value exceeds n (for example, the average monthly print volume PV (3,500)÷paper capacity (500)=7>predetermined value (4)), the processing proceeds to step S507; if it is determined that the division value does not exceed n, the processing proceeds to step S508.

The predetermined value n is equivalent to the number of times a cassette is replenished per month; in the present embodiment, n is set at 4 based on the assumption that the cassette is replenished at the rate of once a week. A preferred embodiment can be one in which the user notifies the diagnostic server 403 from the user's personal computer 402 the maximum number of times the user wishes to replenish cassette per month to determine the value of n. By doing this, a product that more closely matches the user's wish can be recommended.

In step S507, optional paper feed/delivery devices (for example, a 500 page paper feeder and a 500 page paper delivery stacker) that can be mounted on the printer selected are selected by the optional printer and paper feed/delivery device selection section 407.

Information concerning optional paper feed/delivery devices for various printer models is stored in the optional printer and paper feed/delivery device selection section 407, as shown in FIG. 8.

If there is a plurality of optional paper feed devices selected, all the devices are listed. However, devices, each of whose value of the average monthly print volume PV (for example, 3,500 pages) divided by a total paper capacity (for example, 1,000 or 1,500 pages), which is a sum of the standard paper capacity m (for example, 500 pages) and an optional paper capacity m1 (for example, 500 pages) or m2 (for example, 500 pages×2), does not exceed a predetermined value n (for example, 4), are recommended according to the devices' values, where the closer a device's value is to the predetermined value (for example, 4), the higher the priority given to the device. When there are: 1) average monthly print volume PV (3,500)÷(standard paper capacity (500)+optional paper capacity (500))=3.5<predetermined value n (4); and 2) average monthly print volume PV (3,500)÷(standard paper capacity (500)+optional paper capacity (1,000))=2.3<predetermined value n (4), 1) with an optional 500 page feeder is given a higher priority as a recommended device.

The predetermined value n is equivalent to the number of times a cassette is replenished per month; and n is set at 4 in this example based on the assumption that the cassette is replenished at the rate of once a week. If the value of n is determined according to the user's wish, optional paper feed/delivery devices that more closely match the user's wishes can be recommended. Furthermore, as described above, the value of n can be set as the number of times per month the user wishes to replenish the cassette; by doing this, it becomes possible to recommend optional paper feed/delivery devices that match the environment in which the user wishes to use his or her image forming apparatus.

The optional paper delivery devices are selected in the same way the optional paper feed devices are selected, as described above. For the optional paper delivery devices, mailbox devices with multiple bins may be available in some cases that allow sorting of printed documents to avoid the documents from becoming mixed when an image forming apparatus is shared by a plurality of users. A mailbox device may be offered in addition to the optional paper delivery devices selected depending on the number of users who share the image forming apparatus.

For example, if five users share an image forming apparatus, a message that states, "By installing a 5-bin mailbox, printed documents can be sorted without becoming mixed," can be added. In this case, the number of users who share the image forming apparatus is based on the value notified from the user's PC 402 to the diagnostic server 403 upon an input from the user.

In step S508, a specification table/quotation for the printer and/or the optional paper feed/delivery devices selected is created by the specification table/quotation preparation section 411 based on the processing that took place in steps S501–S507.

In step S509, the optional printer and paper feed/delivery device selection section 407 notifies the user of the specification table/quotation that were prepared in step S508.

This notification can be sent as data in a format that can be displayed on the information processing apparatus 402 that the user uses or it can be directly output to the user's printer 401.

Figure 9:
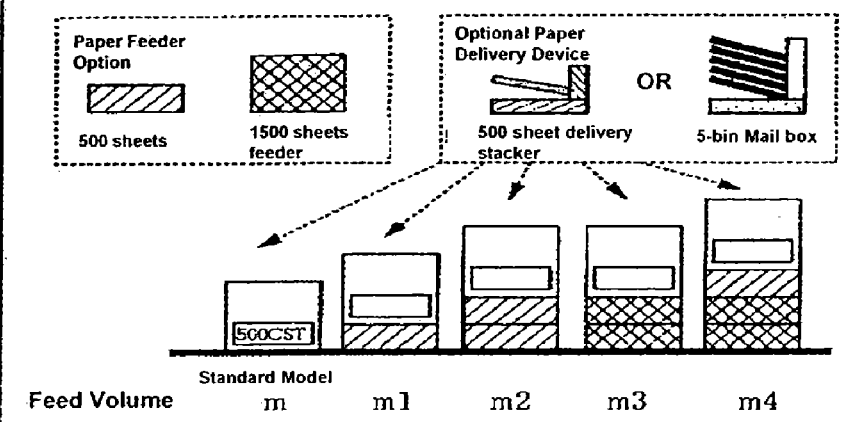
FIG. 9 shows one example of diagnostic result provided by the diagnostic server to the user.

FIG. 9 shows how a specification table/quotation prepared by the specification table/quotation preparation section 411 and sent to the user appears when displayed.

In the example in FIG. 9, the monthly PV calculated by the diagnostic server 403 (in step S504 in FIG. 5) is 5,000, the "printer C" is selected as the optimum printer from the table shown in FIG. 7, and n (the number of times a cassette is replenished per month) is set at "4"; based on FIGS. 7 and 8 and on the processing in step S507, "500 page feeder×2 stages" is selected as the optional paper feeder device.

The information displayed in FIG. 9 that is created by the specification table/quotation preparation section 411 is sent to the addressee indicated in the electronic mail address information in FIG. 6.

As described above, according to the present embodiment, the optimum image forming apparatus can be determined from management information, including information concerning the print volume in a predetermined period, and the optimum image forming apparatus can be recommended to the user efficiently without having to involve another person.

Furthermore, due to the fact that the image forming apparatus that the user currently uses can be specified based on the model information for the user's image forming apparatus, that optimum optional modes that match the image forming apparatus model specified can be extracted from a plurality of possible types or a plurality of possible combinations of optional modes, and that the optional modes extracted can be notified to the user, the user can easily find the optimum optional modes without having to do any onerous research. Moreover, since the optional modes extracted are based on the printing environment that the user desires or on the printing environment that appears to be most favorable, information concerning optional modes that closely match the user's wishes can be sent to the user.

In addition, due to the fact that information concerning the optimum optional paper feed devices that, based on management information including information concerning the print volume in a predetermined period, match the image forming apparatus that the user currently uses can be sent to the user who makes the decision, optional devices that would realize a better printing environment can be recommended without the user having to replace the image forming apparatus that he or she currently uses.

Due to the fact that the recommendation for the optimum image forming apparatus or optional devices is made when the image forming apparatus that the user currently uses is approaching the end of its life, the recommendation information can be provided to the user in a timely manner.

(Second Embodiment)

The first embodiment was based on a premise that various histories of the image forming apparatus are sent to the server unconditionally, but in the second embodiment the user himself or herself can send management information to the server whenever he or she likes in order to have the server perform a diagnosis.

Figure 10:
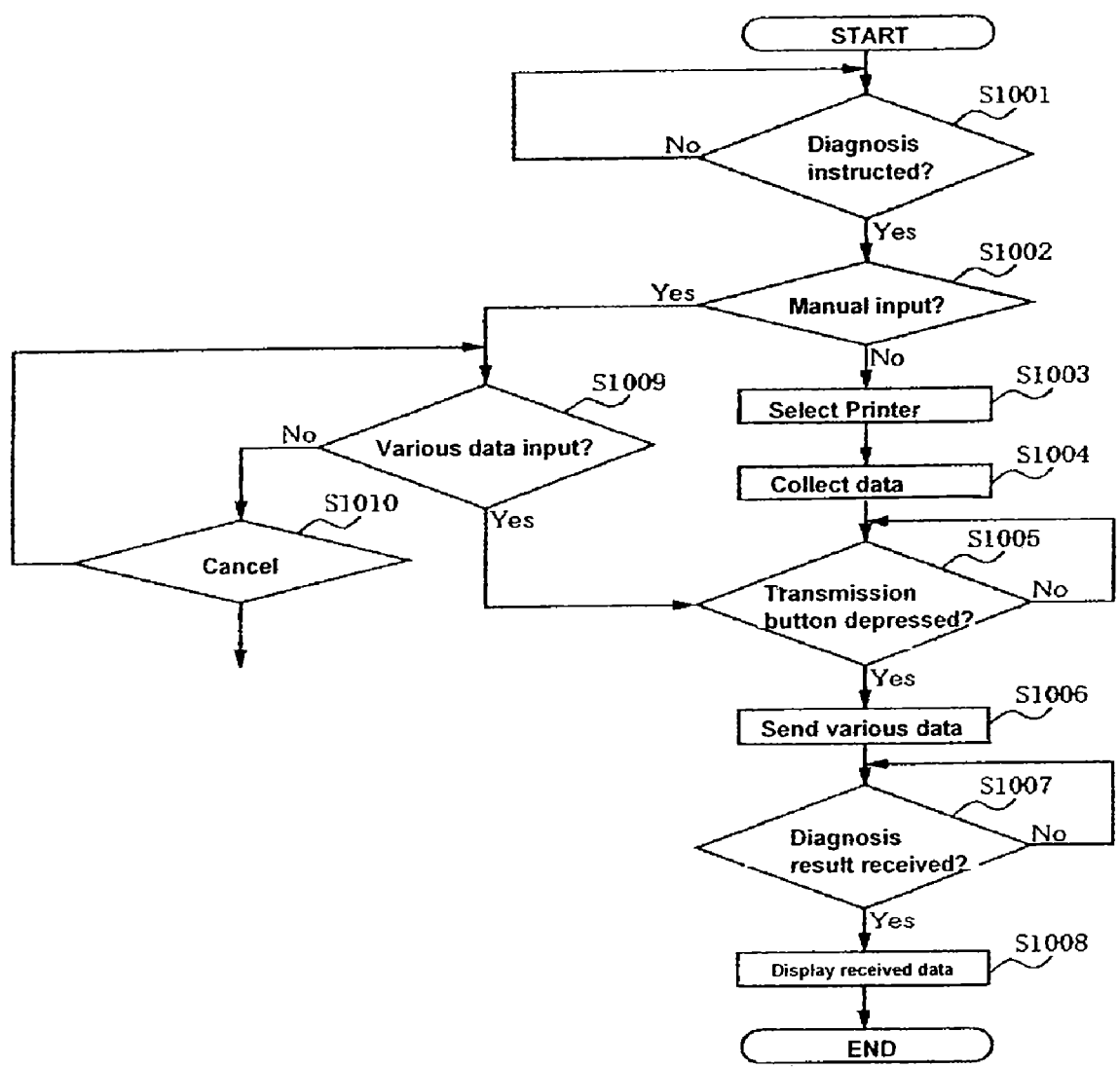
FIG. 10 shows a flowchart indicating one example of diagnostic processing by a user's device in accordance with a second embodiment.

Referring to the flowchart in FIG. 10, the processing that takes place in a user's device will be described. The user's device may be a printer main body or an information processing apparatus such as a personal computer. Processing that takes place in each of the steps in a flowchart in FIG. 10 is realized by having a principal element that performs the processing, whether an image forming apparatus or a CPU that is provided in the server, read program codes stored in a nonvolatile storage means such as ROM or hard disks and execute processing according to the program codes read.

Figure 11:
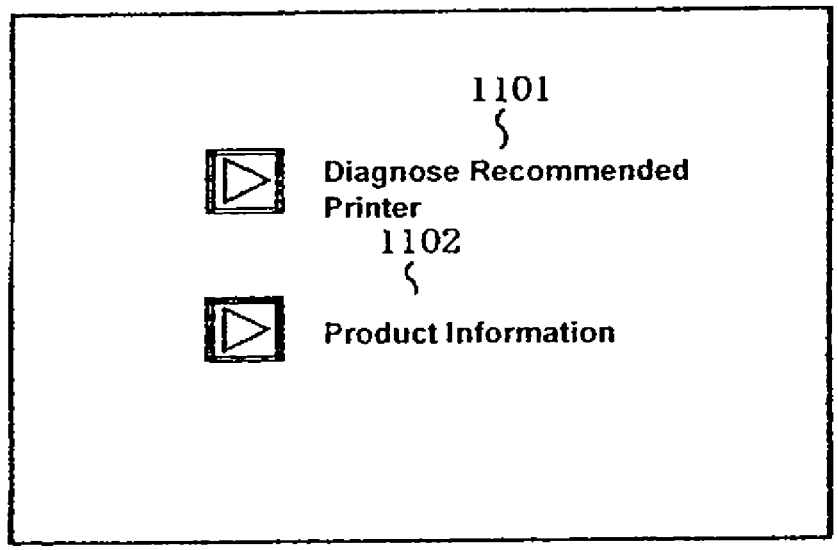
FIG. 11 shows one example of a user interface to instruct a diagnosis for product recommendations.

First, in step S1001, whether an instruction signal that instructs a diagnosis has been sent from the user's equipment is determined. FIG. 11 shows a user interface that is used to instruct a diagnosis from the user's equipment and that is displayed on a display section of an information processing apparatus that the user uses. The content of FIG. 11 can be a display of a part of a printer driver user interface or information that is obtained by a designated URL (uniform resource locator) via the Internet.

In the user interface shown in FIG. 11, when a selection signal is input via an operation button "Diagnose Recommended Printers" 1101, a signal that instructs a diagnosis is sent from the information processing apparatus to a diagnostic server via a predetermined communication line.

Figure 12:
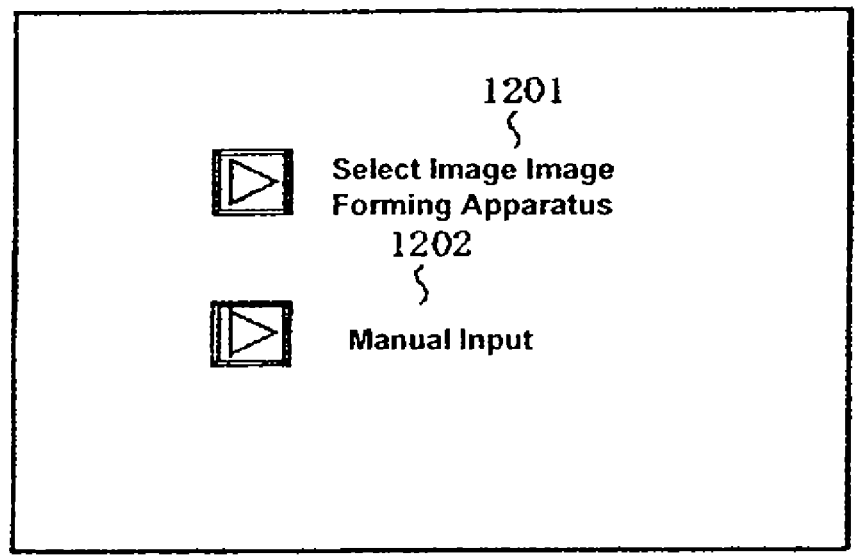
FIG. 12 shows one example of a user interface to instruct a diagnosis for product recommendations.

If it is determined in step S1001 that the answer is Yes, the processing proceeds to step S1002. When the processing proceeds to step S1002, the display in FIG. 11 switches to a display shown in FIG. 12. FIGS. 11 and 12 are displays based on information that is sent from the diagnostic server to the information processing apparatus for the purpose of displaying FIGS. 11 and 12.

In step S1002, a determination is made as to whether to manually input information concerning the image forming apparatus, such as cumulative print volume and period used. This determination is made based on whether an instruction signal that selects step S1202 in FIG. 12 has been sent to the server. Reference numeral 1201 in FIG. 12 denotes a button that instructs the information processing apparatus to automatically obtain management information stored and retained in the image forming apparatus; if the signal indicated by 1201 is sent to the diagnostic server, the determination made in step S1002 is No.

In step S1003, a printer is selected. The printer selection refers to specifying an image forming apparatus that is the target of diagnosis when there is a plurality of image forming apparatuses communicatively connected via a local network to the information processing apparatus used by the user.

In step S1004, operational history information and management information, such as printer model name, manufactured date, and electronic mail address of information sender that are shown in FIG. 6, of the image forming apparatus selected according to the user's instruction are collected. More specifically, when the processing in step S1004 is executed, a management information obtaining program for the image forming apparatus that is installed on the information processing apparatus that the user uses is executed by the information processing apparatus to specify the image forming apparatus according to the user's instruction, and management information (FIG. 6) is requested and obtained from the specified image forming apparatus.

In step S1005, a determination is made as to whether an instruction has been given to the diagnostic server (which is the addressee indicated by the electronic mail address in FIG. 6 or by the address of the diagnostic server obtained by the information processing apparatus via the Internet) to send information that was read onto the information processing apparatus in step S1004 or in step S1009, which is described later.

If it is determined in step S1005 that the instruction to send was given, the information is transmitted in step S1006. Naturally, the transmission of information that takes place in step S1006 can be to the diagnostic server from the user's information processing apparatus through a communication mode that uses the Internet via a plurality of servers or through a communication line that uses a dedicated line.

In step S1007, a determination is made as to whether a reply from the diagnostic server to the information that was sent in step S1006 has been received; if it is determined that the reply has been received, the information received is displayed in step S1008. The information that is sent from the diagnostic server to the user's information processing apparatus is based on the mechanism described in FIG. 5 for the first embodiment, or on the processing result of the flowchart in FIG. 13, which is described later.

In the meantime, if it is determined in step S1002 that a signal instructing to select the "manual input" button 1202 in FIG. 12 has been sent to the diagnostic server, it is determined in step S1009 whether various information indicated in FIG. 6, such as the period used, print volume (this may be for each paper size), printer model and manufacturing number, has been input into the user's information processing apparatus; if it is determined that the information has been input, the processing proceeds to step S1006. If various data that is required for diagnosis is not input and a signal for pressing the send button is input in step S1009, a warning message may be displayed.

Although the processing above has been described as processing performed by the information processing apparatus that is connected communicatively with the image forming apparatus, another mode is also possible, in which the image forming apparatus itself and the diagnostic server send and receive information to and from each other without any involvement by the information processing apparatus, so that it is the image forming apparatus that performs the processing described in the flowchart in FIG. 10.

In that case, the processing that takes place in step S1001, in which a diagnosis is instructed, is executed through an operation display section (equivalent to 324 and 325 in FIG. 3) or an operation button of the image forming apparatus' main body; the processing that takes place in steps S1002, S1003, S1009 and S1010 can be omitted; and the processing that takes place in step S1004 is replaced by a processing in which the image forming apparatus itself reads history information and other information such as the printer model and manufactured date (information such as the information in FIG. 6) that are stored in a predetermined storage section of the image forming apparatus, and the information read is sent in step S1006.

Figure 13:
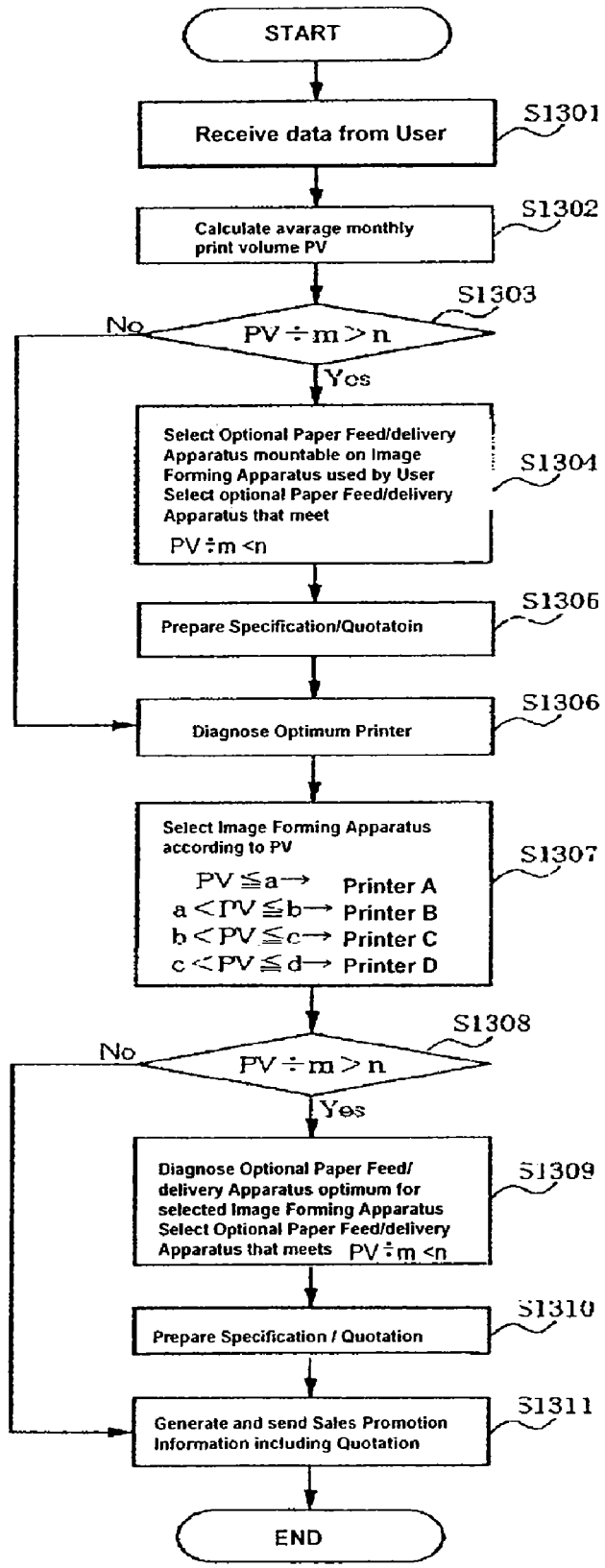
FIG. 13 shows a flowchart indicating one example of diagnostic processing by a diagnostic server according to the second embodiment.

Next, referring to FIG. 13, the processing that takes place in the diagnostic server is described according to the flowchart in FIG. 10 in relation to the processing by the user. Processing that takes place in each of the steps in a flowchart in FIG. 13 is realized by having a principal element that performs the processing, whether an image forming apparatus or a CPU that is provided in the server, read program codes stored in a nonvolatile storage means such as ROM or hard disks and execute processing according to the program codes read.

In step S1301, information that is sent from the user's equipment (an image forming apparatus or an information processing apparatus that the user uses) is received.

In step S1302, a processing to calculate the average monthly print volume (PV) based on the information received in step S1301 takes place. As described earlier, the average monthly print volume can be calculated based on information in FIG. 6 such as the log recording start date, the log recording end date and the print volume. Furthermore, by making use of the print volume for each paper size included in the information received in step S1301, information concerning the print volume for each paper size can be obtained, so that the present invention can be applied to a mode that recommends optional paper feed/delivery devices depending on the paper size.

In step S1303, the image forming apparatus that the user currently uses is specified from the information concerning printer model that is included in the information received in step S1301; the standard paper capacity (paper feed cassette information in FIG. 6) is specified for the image forming apparatus printer model specified; and it is determined whether the value of the printer volume divided by the paper capacity exceeds predetermined value (for example, n=4).

Another preferred embodiment of step S1303 involves referring to information concerning an optional paper feed cassette in the configuration information in FIG. 6, so that a sum of the standard paper capacity (i.e., paper capacity without the optional paper feed cassette mounted) and the paper capacity of the optional paper feed cassette is used as the value of m in step S1303. By doing this, a new optimum product that more closely matches the user's current optional equipment information can be searched. If the answer is determined to be Yes in step S1303, the recommended optional paper feed/delivery devices for the image forming apparatus printer model that the user uses are specified in step S1304. To describe the processing that takes place in step S1304 in greater detail, optional devices that match the printer model based on the printer model information included in the information obtained in step S1301 are specified. This specifying processing is realized by using a search table in which printer models and optional devices are matched as in FIG. 8, which was described as part of the first embodiment. Naturally, the search table provided by an optional printer and paper feed/delivery device selection section 407 is not limited to the one shown in FIG. 8, and optional paper feed/delivery devices that match various printer models other than the printer models indicated in FIG. 8 are searchable. Furthermore, search targets for the printer models are not limited to optional paper feed/delivery devices, and various optional devices such as large capacity black ink tanks, for example, may also be matched. This also applies to the first embodiment.

The average monthly print volume (PV) for the image forming apparatus used by the user is matched with the PV in step S1304, and optional paper feed/delivery devices are selected based on their values of n in the order closest to the predetermined value (for example, n=4). As described earlier, candidates for optional paper feed devices selected are specified from the printer model names based on the search table such as shown in FIG. 8 (for example, for printer C in FIG. 8, the candidates are a 500 page feeder, a 500 feeder×2, a 1,500 page feeder, a 500 page delivery stacker, a 500 page delivery stacker×2, and a 5-bin mailbox).

In step S1305, a specification table/quotation is prepared to be sent to the user as information concerning recommended optional products specified in step S1304.

In step S1306, in addition to selecting the optimum optional paper feed/delivery devices based on the operational history of the image forming apparatus used by the user, a new image forming apparatus based on the average monthly print volume of the image forming apparatus that the user currently uses and optional paper feed/delivery devices for the new image forming apparatus are selected.

In step S1307 to S1311, the optimum printer (i.e., a printer with optimum print speed) for the average monthly print volume of the image forming apparatus that the user currently uses and optional paper feed/delivery devices are searched and extracted, and specification table/quotation information to be sent to the user's device is created. The details of the processing that takes place in steps S1307 to S1311 are similar to those of the processing that takes place in steps S505 to S509 in FIG. 5 of the first embodiment and their description is therefore omitted.

As described above, in addition to what the first embodiment provides, the user himself or herself can send management information to the server when he or she likes, so that the optimum image forming apparatus and/or various optional devices for the image forming apparatus can be recommended based on the way (for example, PV) the user uses his or her image forming apparatus, according to the second embodiment.

(Other Embodiments)

The present invention may be applied to a system comprising a plurality of equipment (for example, a host computer, an interface equipment, a reader, and a printer) or to an apparatus comprising one equipment (a copier, a printer, or a facsimile machine).

The purpose of the present invention can be achieved by having a storage medium store program codes of software that realize the functions of the embodiments described above, and by having a computer (or a CPU or an MPU) of a system or a device read and execute the program codes stored in the storage medium.

In this case, the program codes themselves that are read from the storage medium realize the functions of the embodiments described above, and the storage medium that stores the program codes or the program codes themselves constitute the present invention.

The storage medium on which to supply the program codes may be a floppy disk, a hard disk, an optical disk, an optical magnetic disk, an MO, a CD-ROM, a CD-R, a DVD, a magnetic tape, a nonvolatile memory card or a ROM.

Furthermore, the present invention is applicable not only when the program codes read by a computer are executed to realize the functions of the embodiments, but also when an operating system that operates on the computer performs a part or all of the actual processing based on the instructions contained in the program codes and thereby realize the functions of the embodiments.

Moreover, the present invention is also applicable when the program codes that are read from the storage medium are written onto an expansion board inserted into a computer or on a memory of an expansion unit connected to a computer, and a CPU provided on the expansion board or the expansion unit performs a part or all of the actual processing based on the instructions contained in the program codes and thereby realize the functions of the embodiments.

As described above, according to the present invention, the optimum image forming apparatus and/or optional devices can be determined based on the usage of the user's image forming apparatus, which allows the user to obtain information concerning the optimum image forming apparatus and/or optional products without having to do any onerous research.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A diagnostic system capable of communicating with an information processing apparatus, said system comprising:
    an obtaining unit adapted to obtain information of print volume for a certain period via a communication line, the information being entered in the information processing apparatus by a user;
    a determination unit adapted to determine a type of a recommendable image forming apparatus based on the information obtained by said obtaining unit; and
    a notification unit adapted to notify the information processing apparatus of information indicative of the type of the recommendable image forming apparatus determined by said determination unit,
    wherein said notification unit notifies the information processing apparatus of information on an option to the recommendable image forming apparatus whose type is determined by said determination unit.

2. A system according to claim 1, wherein the information on the option is provided based on the information of print volume obtained by said obtaining unit.

3. A diagnostic method carried out in a diagnostic system capable of communicating with an information processing apparatus, said method comprising:
    an obtaining step of obtaining information of print volume for a certain period via a communication line, the information being entered in the information processing apparatus by a user;
    a determination step of determining a type of a recommendable image forming apparatus based on the information obtained in said obtaining step; and
    a notification step of notifying the information processing apparatus of information indicative of the type of the recommendable image forming apparatus determined in said determination step, wherein said notification step includes notifying the information processing apparatus of information on an option to the recommendable image forming apparatus whose type is determined in said determination step.

4. A method according to claim 3, wherein the information on the option is provided based on the information of print volume obtained in said obtaining step.

5. A program stored in a computer-readable storage medium such that, when executed by a computer, the program causes the computer to execute a diagnostic method carried out in a diagnostic system capable of communicating with an information processing apparatus, the method comprising:

an obtaining step of obtaining information of print volume for a certain period via a communication line, the information being entered in the information processing apparatus by a user;

a determination step of determining a type of a recommendable image forming apparatus based on the information obtained in said obtaining step; and a notification step of notifying the information processing apparatus of information indicative of the type of the recommendable image forming apparatus determined in said determination step, wherein said notification step includes notifying the information processing apparatus of information on an option to the recommendable image forming anparatus whose type is determined in said determination step.

6. A program according to claim 5, wherein the information on the option is provided based on the information of print volume obtained in said obtaining step.

* * * * *